United States Patent [19]

Busche et al.

[11] Patent Number: 4,773,091
[45] Date of Patent: Sep. 20, 1988

[54] TELEPHONE HANDSET FOR USE IN NOISY LOCATIONS

[75] Inventors: Alan C. Busche, Dorchester; Beverley W. Gumb, London, both of Canada

[73] Assignee: Northern Telecom Limited, Montreal, Canada

[21] Appl. No.: 874,923

[22] Filed: Jun. 16, 1986

[51] Int. Cl.$^4$ .............................................. H04M 1/03
[52] U.S. Cl. ..................... 379/433; 381/189; 381/169
[58] Field of Search ............... 381/168, 169, 191, 151, 381/155, 158, 159, 189, 156; 379/432, 433, 429, 419, 420; 307/400

[56] References Cited

U.S. PATENT DOCUMENTS

| | | | |
|---|---|---|---|
| 3,627,930 | 12/1971 | Tolman | 379/429 X |
| 3,830,988 | 8/1974 | Mol et al. | 379/419 |
| 4,178,488 | 12/1979 | Nishihata | 379/432 X |
| 4,237,350 | 12/1980 | Ruzic | 379/433 |
| 4,400,589 | 8/1983 | Synek et al. | 379/391 |
| 4,424,419 | 1/1984 | Chaput et al. | 381/191 |
| 4,463,222 | 7/1984 | Paradowski | 381/159 X |
| 4,594,478 | 6/1986 | Gumb et al. | 381/159 X |
| 4,636,591 | 1/1987 | Kuhfus et al. | 379/433 X |
| 4,672,666 | 6/1987 | Kuhfus | 379/433 |

FOREIGN PATENT DOCUMENTS 1199138 1/1986 Canada .
1016716 1/1966 United Kingdom ................ 381/156

OTHER PUBLICATIONS

"Design of a Studio-Quality Condenser Microphone Using Electret Technology", W. Bevan et al., Journal of the Audio Engineering Society, Dec. 1978, vol. 26, No. 2, pp. 947–957.

Primary Examiner—Jin F. Ng
Assistant Examiner—Randall S. Vaas
Attorney, Agent, or Firm—Sidney T. Jelly

[57] ABSTRACT

A telephone handset for use in noisy locations has a noise cancelling electret transmitter which receives a normal acoustic input at the front end and a background noise acoustic input to the rear end. The input to the rear end is via a grill on the back side of the handset. A dielectric shield is positioned between the grill and the transmitter. A resistor is inserted in series with the transmitter to reduce the sensitivity and produce a lower than normal transmit level. Also, a filter is used to reduce the level of high frequency emphasis.

6 Claims, 1 Drawing Sheet

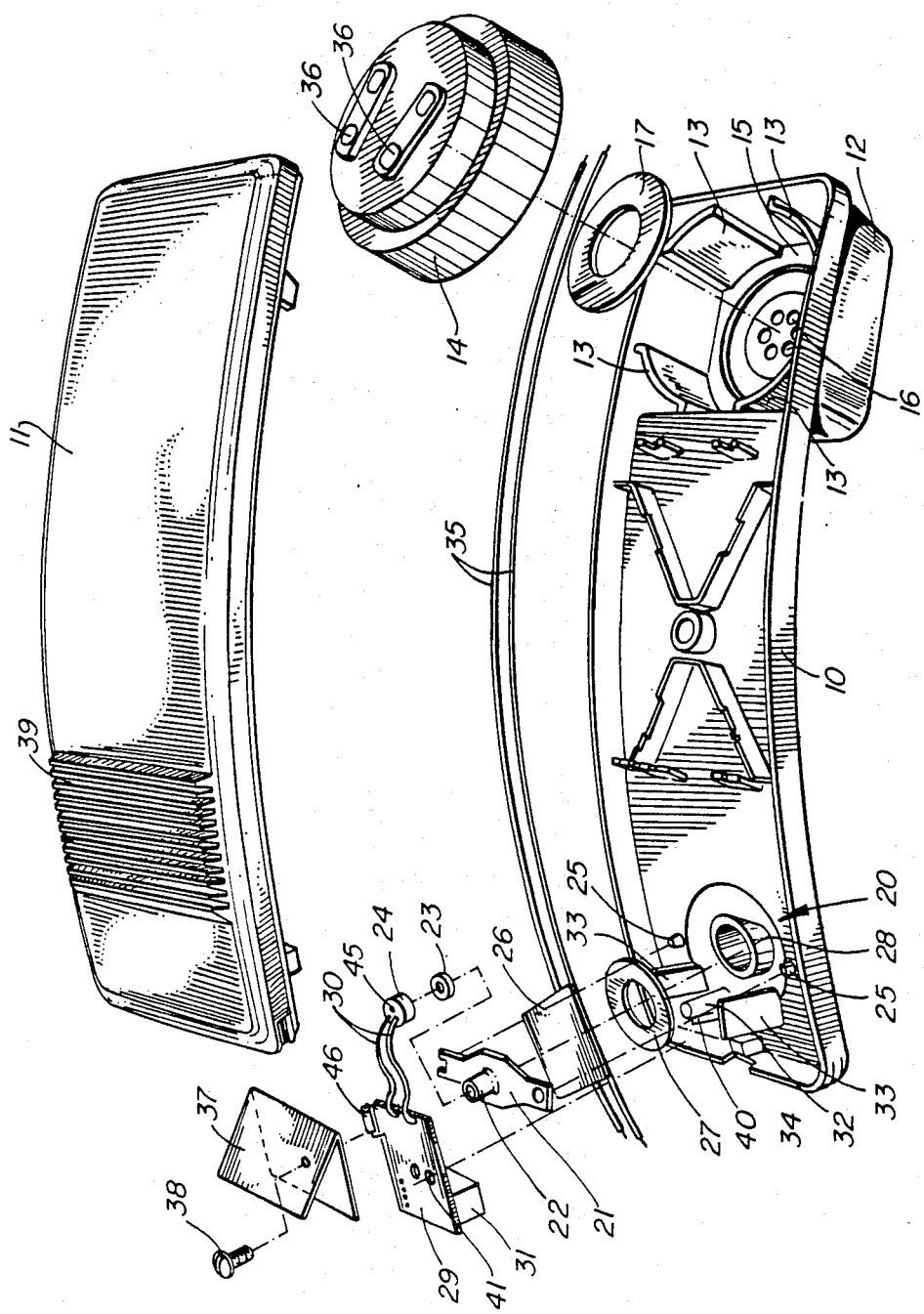

TELEPHONE HANDSET FOR USE IN NOISY LOCATIONS

This invention relates to a telephone handset for use in noisy locations.

In noisy locations, a standard handset transmitter, or microphone, will also transmit noise. This can interfere with the ability to hear, and understand, what is being said.

The present invention provides a noise cancelling electret microphone which has noise ports at its back, or rear end, facing towards the back, or rear, of the handset. A grill is provided in the back surface of the handset to provide acoustic access to the back end of the transmitter. Additionally, the sensitivity of the electret microphone is reduced by a resistor in series to provide a lower than normal transmit level. The acoustics are adjusted to give a lower level of high frequency emphasis, for example 5 dB, to avoid a tinny sounding background signal.

The invention will be readily understood by the following description.

The sole drawing FIGURE is an exploded perspective view of a handset embodying the invention.

As illustrated in the drawing, a handset has two hollow housings, a front housing 10 and a back housing 11. At one end of the front housing is a rectangular tubular extension 12, extending forward from the main part of the housing. Within the tubular extension 12 are a plurality of arcuate ribs 13 defining a mounting position for a receiver 14. At the forward end of the tubular extension 12 is an end face 15 in which are formed a plurality of apertures 16. A gasket 17 is positioned between the front face of the receiver and the end face 15.

At the other end of the front housing is a mounting position 20 for a transmitter assembly. The transmitter assembly comprises a holding member 21 having a central tubular member 22. Positioned in a tubular member is an annular gasket 23 and an electret transmitter 24. The holding member 21 is mounted on pillars 25, with an acoustic filter 26 and gasket 27 positioned between the holding member and a tubular support member 28 at the mounting position 20.

The transmitter 24 is connected to a circuit pattern on a small circuit board 29 by conductors 30. The circuit board also carries a modular jack 31. The circuit board rests on a hollow boss 32, also resting on two locating members 33. When the circuit board is in position, the jack 31 is aligned with an aperture 34 in the end wall of the housing 10. Two conductors 35 extend between the circuit board 29 and contact pads 36 on the receiver 14. A static shield 37, of dielectric material, is positioned over the circuit board 25, a screw 38 passing through the shield 37, board 29 into the boss 32. The shield 37 protects components, on or connected to the circuit on the circuit board from static discharge through a grill 39 in the housing 11. A locating pin 40 passes through a hole 41 in the circuit board for additional location.

The transmitter 24 comprises a transducer encapsulated in a housing, which receives an acoustic input, in a normal manner, via one or more apertures in the front housing 10 at the mounting position 20. The input is through the filter 26, an aperture in the front end of the tubular member 22, a central hole in the gasket 23, and through an open end of the encapsulating housing. However, in the invention, the transmitter 24 has an opening in the rear of the encapsulating housing, the opening indicated at 45. A further feature is a resistor 46, mounted on the circuit board 29, in series with the transmitter. The resistor reduces the transmit level of the transmitter. Also, the acoustics are adjusted, by the filter 26, to reduce the level of high frequency emphasis, for example by 5 dB.

Input through the grill 39 to the rear of the transmitter provides at least some noise cancellation for background noise. Thus the transmitter produces an output signal related to the user generated signal which has an improved signal strength relationship, relative to the background noise.

What is claimed is:

1. A telephone handset for use in noisy locations, comprising:
    a front housing and a back housing joined together;
    a tubular extension at one end of said front housing, the tubular extension extending forward from said front housing, and a receiver mounted in said tubular extension;
    means mounting a transmitter at the other end of said front housing, said means comprising a tubular support on said front housing and extending rearward thereof; a gasket resting on said tubular support and having an aperture therein; a holding member positioned on said gasket, said holding member including a tubular member; an annular gasket in said tubular member; said transmitter which comprises an electret transducer positioned in said tubular member on said annular gasket; said electret transducer enclosed in a housing open at a front end for admission of an acoustic input to the front of the transducer and having an opening at the rear for admission of an acoustic input from background noise to the rear of the transducer; an aperture in said front housing aligned with said tubular support to permit said admission of an acoustic input to the front end of the transducer; a grill in said back housing, aligned with said transmitter, and a dielectric shield positioned between said grill and said transmitter; a resister in series with the transmitter to reduce the transmit level; and a filter in front of the transducer to reduce the level of high frequency emphasis.

2. A handset as claimed in claim 1, including a circuit board mounted at said other end of said front housing, said transmitter connected to a circuit pattern on said circuit board and said resistor mounted on said circuit board.

3. A handset as claimed in claim 2, including locating and support members at said other end of said front housing, said circuit board located by and mounted on said locating and support members.

4. A handset as claimed in claim 3, said circuit board aligned with said grill in said back housing, said dielectric shield mounted on said circuit board, between said circuit board and said grill.

5. A handset as claimed in claim 4, including a modular jack mounted on said circuit board on a surface remote from said dielectric shield, and an aperture in said front housing at said other end aligned with said modular jack.

6. A handset as claimed in claim 1, including a plurality of arcuate ribs in said tubular extension and forming said means mounting said receiver.

* * * * *